J. A. BROOKS.
CAR BRAKE.
APPLICATION FILED JUNE 20, 1913.
1,162,219.
Patented Nov. 30, 1915.
3 SHEETS—SHEET 2.
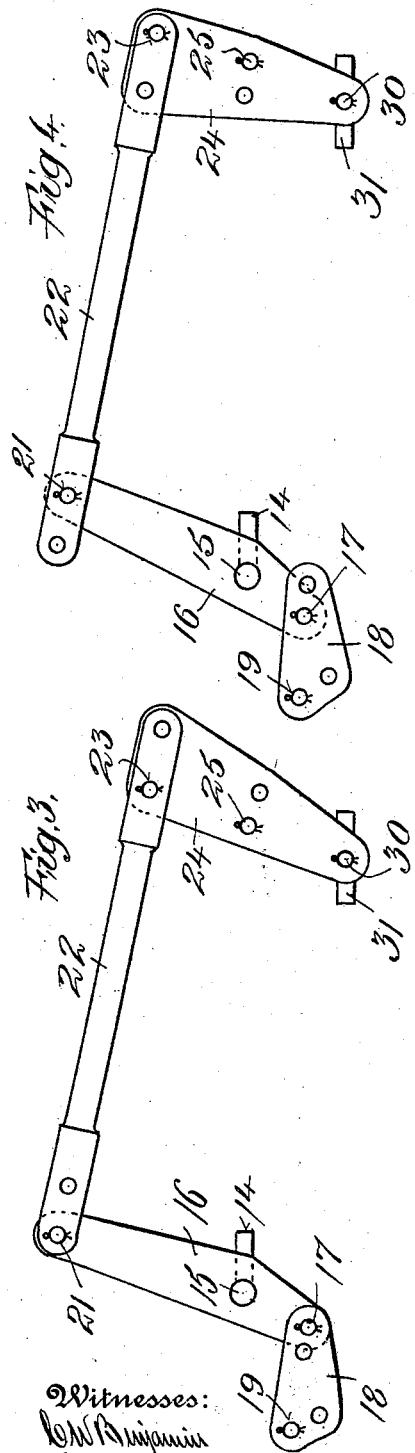
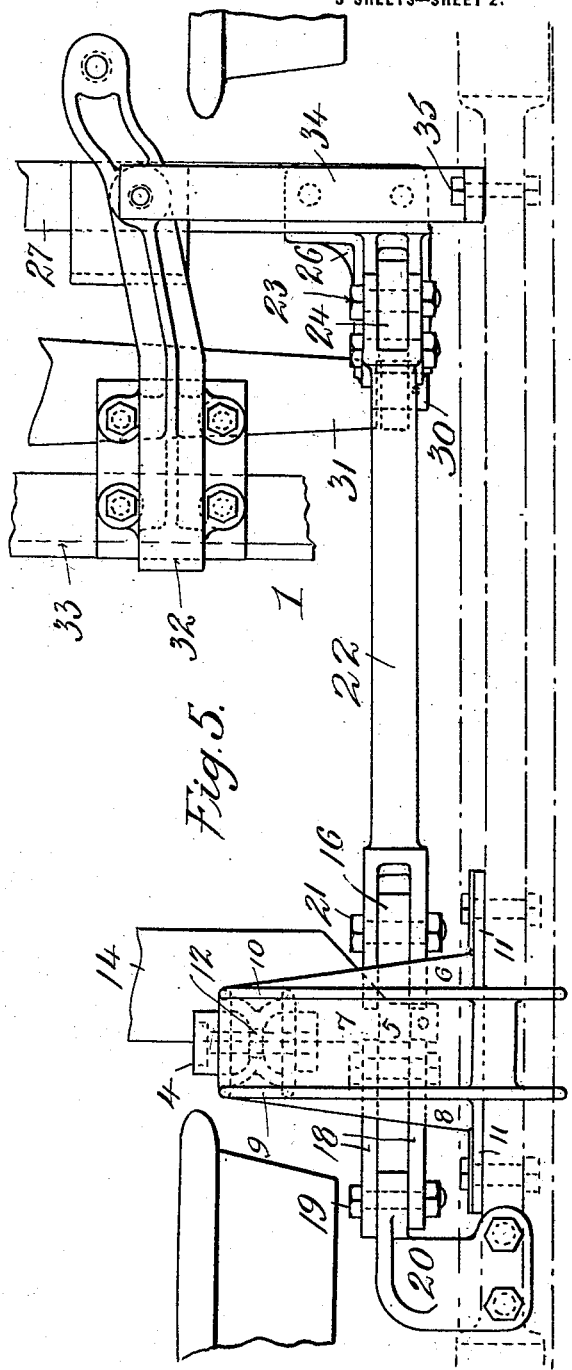
Witnesses:
Inventor
James A. Brooks
By his Attorney

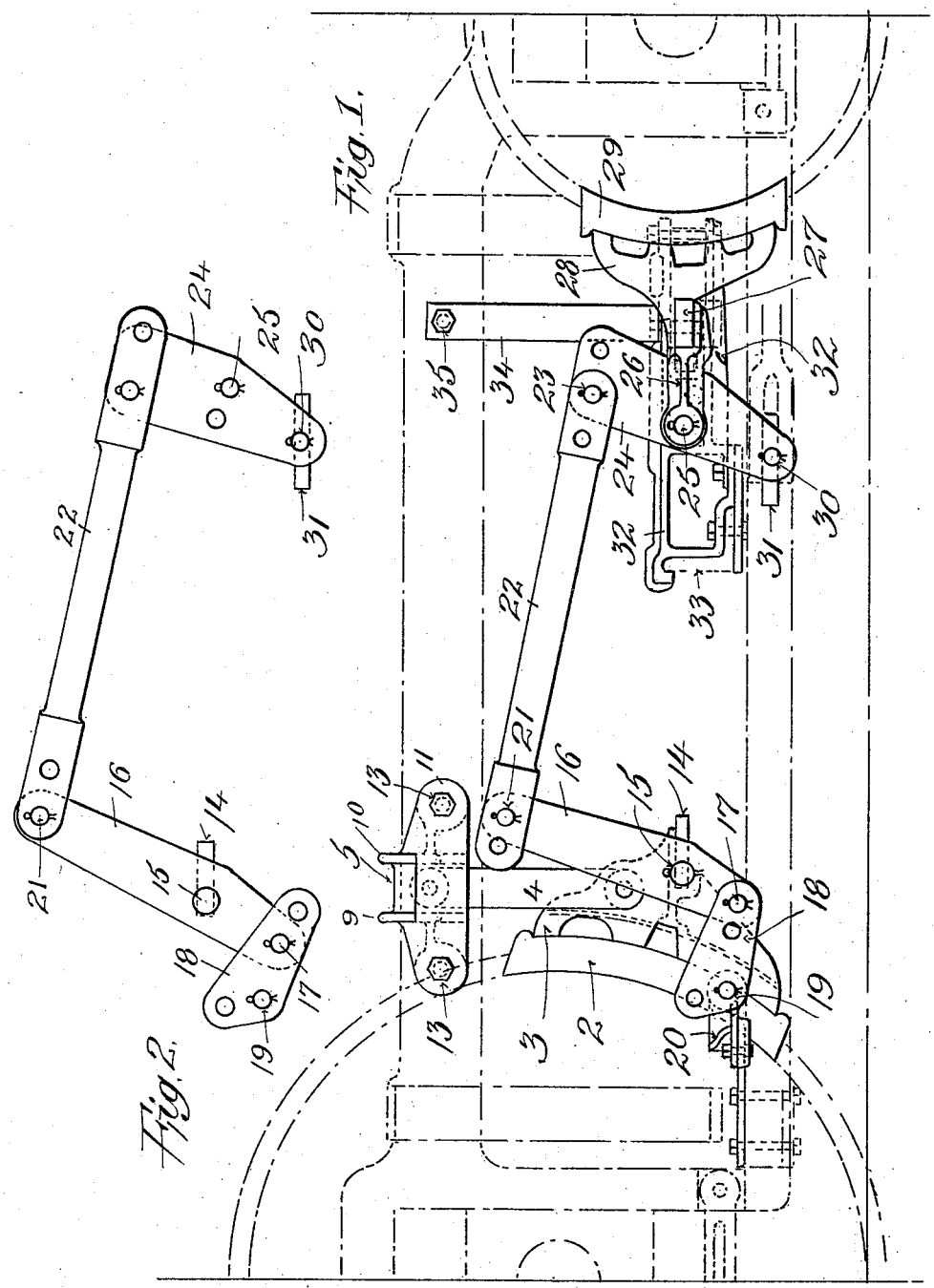

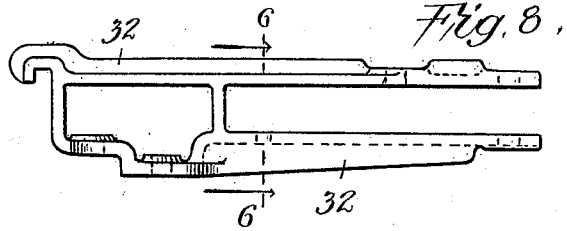
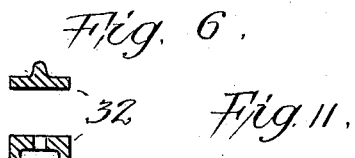
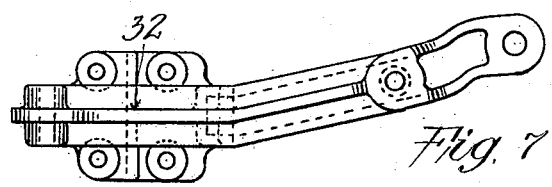
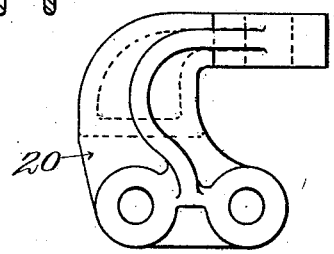
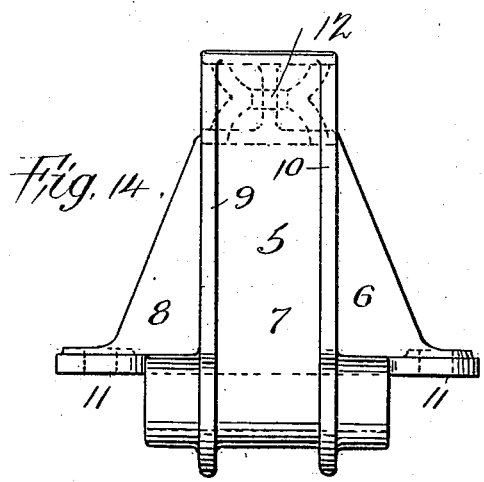
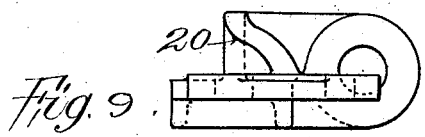
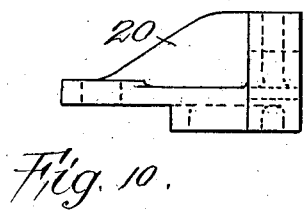
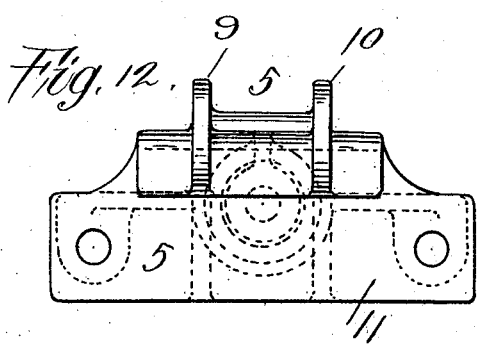
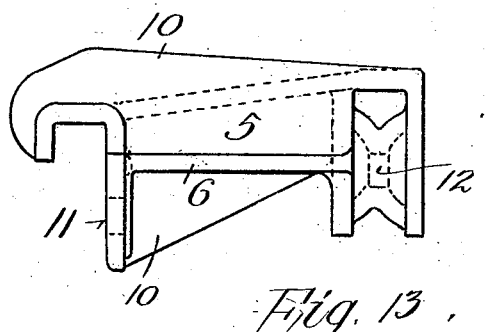

UNITED STATES PATENT OFFICE.

JAMES A. BROOKS, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

CAR-BRAKE.

1,162,219.  Specification of Letters Patent.  Patented Nov. 30, 1915.

Application filed June 20, 1913. Serial No. 774,754.

*To all whom it may concern:*

Be it known that I, JAMES A. BROOKS, a citizen of the United States, and a resident of the city and county of Philadelphia, State of Pennsylvania, have invented a new and useful Improvement in Car-Brakes, of which the following is a specification.

The object of my invention is to provide a suitable brake mechanism which will be low hung so as to be suitable for truck when used on what are known as stepless cars, and also to provide a brake mechanism which will allow a maximum capacity for adjustment to take up wear.

These objects are accomplished by my invention, one embodiment of which is hereinafter set forth.

For a more particular description of my invention, reference is to be had to the accompanying drawings, forming a part hereof, in which—

Figure 1 is a side elevation of my improved brake applied to a truck, the truck being shown in dotted lines. Figs. 2, 3 and 4 show a part of the mechanism in various positions of adjustment, Fig. 2 showing the part as installed on a new truck, Fig. 3 shows a change after a certain amount of wear has been had, and Fig. 4 a still further change for a larger amount of wear. Fig. 5 is a plan view of the structure shown in Fig. 1. Figs. 6, 7 and 8 show a bracket for supporting a portion of the brake gear, Fig. 6, being taken on the line 6—6 of Fig. 8 looking in the direction of the arrows, Fig. 8 being a side elevation and Fig. 7 a plan view. Figs. 9, 10 and 11 show a pivot support for a portion of the brake mechanism, the views being taken at right angles to each other. Figs. 12, 13 and 14 are a side elevation an end elevation and a plan view, respectively, of a bracket for supporting a hanger which in turn supports a brake shoe holder.

Throughout the various views of the drawings, similar reference characters designate similar parts.

My improved brake mechanism 1 may be applied to any suitable truck, but is preferably placed on a truck of the maximum traction type with large driving wheels and small trailing wheels, as indicated in dotted lines. A brake shoe 2 is adapted to bear on a large driving wheel and this brake shoe is held by a brake shoe head 3, both of which may be of the conventional form. The head 3 is carried by a suitable hanger 4 which is supported from a bracket 5 which is shown in detail in Figs. 12, 13 and 14. This bracket is preferably provided with suitable horizontal webs 6, 7 and 8 and vertical webs 9 and 10. These webs 9 and 10 are projected beyond the webs 6 and 8 in both directions, as appears in Fig. 13. At one end of each of these webs 9 and 10 and of the webs 6, 7 and 8, an additional web 11 first runs vertically and then horizontally and then vertically to form a notch suitable to fit on the top chord of a truck, and at the other end of said webs 6, 9 and 10 is formed a suitable seat 12 for the upper end of the hanger 4. The support or bracket 5 is held in place by means of suitable bolts 13 or by any other suitable means.

The brake shoe holder 3 is connected to a suitable brake beam 14 which also engages a corresponding brake shoe holder at the other side of the truck, not shown. The exposed ends of this brake beam 14 are provided with suitable trunnions 15 on each of which is pivotally mounted a dead lever 16. The lower end of the dead lever 16 engages a pin 17 which may be passed through either of two openings in a double link 18 which engages a second pin 19 mounted in a suitable bracket 20 which is fixed to the lower chord of one side frame of the truck. The link 18 is provided with two holes at each end, as shown, the holes at one end being adapted to receive the pin 17 and the holes at the other end the pin 19.

The upper end of the lever 16 carries a suitable pin 21 which is adapted to enter either of two holes in the divided end of a link 22, and the other end of this link is similarly divided and provided with two holes either of which may receive a pin 23 mounted in a live lever 24. It also has two holes at its upper end. The lever 24 is fulcrumed at 25 on a trunnion corresponding to the trunnion 15 which is carried in a suitable bracket 26 which is fixed to a brake beam 27. The brake beam 27 is fixed to a brake shoe holder 28 that carries a brake shoe 29 which is adapted to engage the smaller of the wheels at one side of the truck. It will be understood that the corresponding mechanism is the same on the other side of the truck, so that a description of one will answer for both. The lower end of the lever 24 carries a suitable trunnion 30 on an equalizing bar 31 to which the brake actuating mechanism may be attached.

The brake beam slides freely in a bracket 32 which is shown in detail in Figs. 6, 7 and 8. One end of this bracket 32 is adapted to fit on a seat formed in a crossing 33 of the truck and the other end is bifurcated and open so as to form a suitable slide for the brake beam. It will be noted that the end which is bifurcated is not straight but is bent as shown at Fig. 7 so as to clear the wheel, and yet be as close to the wheel as possible, so as not to interfere with a car body during the radiation of the truck when taking a curve. This bracket 32 is further reinforced by a suitable hanger or strap 34 the upper end of which is secured by a suitable bolt 35 to the top chord of the truck and the lower end by a suitable bolt passing into the bracket 32. The open ends of the bracket 32 are preferably connected by suitable bolts after the brake beam 27 is in place.

The brackets 20 and 32 may be varied in shape, but they are preferably made as shown, as this structure is concise, practical and sufficient for braking purposes, yet does not in any way interfere with the radiation of the truck, as above pointed out.

When my improved brake mechanism is constructed, as shown, and power is applied to the equalizing bar 31 in the conventional manner, this power is transmitted through the trunnion 30 to the lever 24. The lever 24 transmits some of this power to the trunnion 25 and thence to the brake beam 27 by way of the bracket 26, and from thence to the brake shoe holders 28 and from there to the brake shoes 29. The balance of this power is transmitted to the pin 23 and from thence to the links 22, the pin 21, the lever 16 and trunnion 15, and from thence to the brake shoe holders 3 and brake shoes 2, the portion of pressure applied to each set of wheels will depend upon the distances from the pivot 30 to the pivots 25 and 23 and the pivot 15 from the pivots 17 and 21. A release of the pressure on the equalizing bar 31 releases the brake mechanism in the conventional manner. From time to time as wear occurs, one or more of the pivots 17, 21, 23 and 25 may be shifted, as indicated in Figs. 1, 2, 3 and 4. By shifting as above indicated, a very large amount of adjustment may be had which is ample to take up all wear that may occur.

While I have shown and described one embodiment of my invention, it is obvious that it is not restricted thereto, but is broad enough to cover all structures that come within the scope of the annexed claims.

What I claim is:

1. In a device of the class described, a brake shoe holder and means for supporting the same from the top chord of the brake frame, a dead lever pivotally connected to said brake shoe holder, a link and means for connecting the same to the truck frame and to the bottom of said dead lever, a second link connected to the top of said dead lever, a live lever also connected at its top to said last mentioned link, a brake shoe holder, a brake beam, means for supporting said brake beam so that the same may slide, and means for connecting said live lever with said brake beam and an equalizing bar adapted to actuate said live lever, said live and dead levers being outside the wheel base.

2. In a device of the class described, a dead lever and a live lever and a link connecting the same, a brake shoe holder and means for connecting said dead lever with the same, a second brake shoe holder and means for connecting said live lever with the same, means for connecting the bottom of said dead lever with the truck frame and means for connecting said live lever with the brake actuating mechanism, and a slide for supporting said second brake shoe holder, said live and dead levers being placed outside the wheel base.

3. In a device of the class described, a bracket for supporting a slidably mounted brake beam having a part adapted to fit on a crossing and another part adapted to support the said brake beam, said brake beam supporting part being curved so as to clear a car body carried by the truck to which the brake is attached.

4. In a device of the class described, a bracket for supporting a slidably mounted brake beam, the same having a part adapted to fit on a crossing and the other end bifurcated and open and curved so as to clear the wheel.

5. In a device of the class described, a bracket for supporting a slidably mounted brake beam, the same having a part adapted to fit on a crossing and the other end bifurcated and open and curved so as to clear the wheel and a reinforcing member for said bracket.

6. In a device of the class described, a bracket for supporting a slidably mounted brake beam, the same having a part adapted to fit on a crossing and the other end bifurcated and open and curved so as to clear the wheel, and means adapted to connect the open ends of said bracket after the brake beam is applied.

Signed at the city of Philadelphia, county of Philadelphia, and State of Pennsylvania, this 14th day of June, 1913.

JAMES A. BROOKS.

Witnesses:
HENRY C. ESLING,
H. F. McKILLIP.